Feb. 20, 1934.                T. R. SCOTT ET AL                1,947,676
                              SINGLE CORE CABLE
                              Filed Feb. 5, 1930

INVENTORS
THOMAS R. SCOTT
BY NORMAN A. ALLEN

*T. Hutchinson*
ATTORNEY

Patented Feb. 20, 1934

1,947,676

UNITED STATES PATENT OFFICE 1,947,676

SINGLE CORE CABLE

Thomas Robertson Scott and Norman Arthur Allen, Aldwych, London, England, assignors to International Standard Electric Corporation, New York, N. Y.

Application February 5, 1930, Serial No. 426,094, and in Great Britain July 26, 1929

8 Claims. (Cl. 173—266)

This invention relates to improvements in single core electric cables and more particularly to cables such as described in British Patent 291,-871.

In the British Patent 291,871 there is described a single core electric cable for power transmission having over the core of the cable an impregnated fibrous insulation surrounded by a permeable conductive intersheath over which sheath is an outer layer of porous material less absorbent than the main insulation and over this porous material is placed the usual lead sheath, the intersheath and the lead sheath being in conductive contact with one another.

In a cable of this construction the dielectric of the cable is maintained substantially homogeneous, as with expansion of the dielectric some of the impregnating material or compound will pass through the pores of the intersheath to the outer porous layer and on contraction of the dielectric, the compound will be drawn back from the porous layer.

The present invention relates to the construction of the porous outer layer mentioned above.

According to one embodiment of the invention a number of folded plain or creased paper tapes are wound helically over the intersheath and a metal wire or tape is placed in the spaces between the successive turns of the helix to make contact between the intersheath and outer lead sheath.

According to another embodiment of the invention, the porous layer is provided by a woven tape of cotton or other textile material having metal wire woven into it in such a way as to make conductive contact between the intersheath and the outer lead sheath.

According to yet another embodiment of the invention, the porous layer consists of a composite tape comprising a plurality of plain or creased strips of paper, textile or other porous material surrounded by a metallic or metallized covering.

The invention will be more clearly understood from the following detailed description when taken in conjunction with the accompanying drawing in which.

Figure 1:
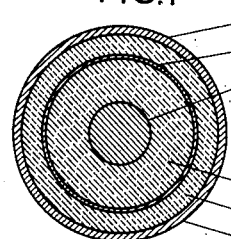
Fig. 1 shows a cross section of a cable constructed according to British Patent 291,871.

In Fig. 1 is shown a cross section of a cable constructed in accordance with British Patent 291,871. This cable comprises a conductive core A around which is placed the main insulation B of fibrous material. Surrounding this insulation is a permeable intersheath C preferably in the form of metallized paper. A porous layer D having less absorbent properties than the main insulation B surrounds the intersheath C. Over the porous layer D is placed the usual protective lead sheath E. The fibrous insulation B is impregnated with a suitable oil or liquid compound usually employed in this type of cable, and the layer D should be likewise impregnated or the material of D may be left incompletely impregnated. When the cable is in use and owing to temperature conditions, etc. the dielectric expands, some of the impregnating material may pass through the permeable intersheath and be taken up by the porous layer D or in the space found outside this layer by expansion of the sheath. In this manner the dielectric between the intersheath C and the core A is maintained substantially homogeneous. Should a contraction take place, impregnating material will be drawn back by the more absorbent layer B, so that the homogeneity of the dielectric B is maintained.

Figure 2:
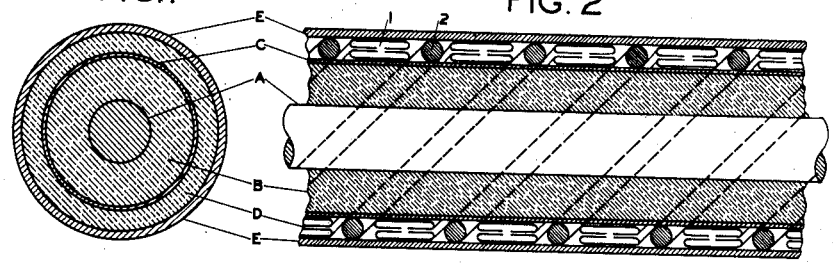
Fig. 2 is a longitudinal section of a cable showing one form of porous layer according to this invention.

In Fig. 2 is shown one form of construction of the porous layer. A belt or tape 1 of porous material is wound in an open helix around the intersheath C. This belt may consist of a number of plain or folded porous paper strips, cotton wick or similar material. Into the space between the adjacent turns of the belt or tape is placed also in a helix a metal wire or tape 2 preferably of copper, tinned copper or aluminium. Instead of the wire 2 a composite tape of the type described below can be used so that the composite tape and the porous tape 1 alternate being wound with the same pitch. This wire 2 or the composite tape if the latter is used, makes contact between the intersheath C and the lead sheath E thus electrically connecting C and E and making them of equal electrical potential.

Figure 4:
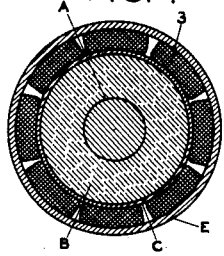
Fig. 4 is a cross section of a cable showing yet another form of the porous layer.
Figure 3:
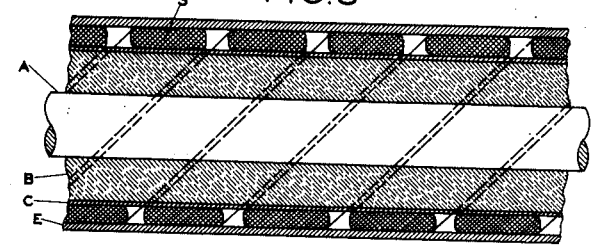
Fig. 3 is a longitudinal section of a cable showing a modified form of the porous layer.

Fig. 3 shows another way of constructing the porous layer. In this case a composite tape 3 consisting of porous material and conducting material is interposed between and in contact with the intersheath C and the lead sheath E. This composite tape can be placed around the intersheath C in form of a helix as shown in Fig. 3 or longitudinally as shown in Fig. 4.

The composite tape 3 may consist of a woven textile material such as cotton or the like into which a conductive material is woven in such a way as to make electric contact between the intersheath C and the lead sheath E.

Figure 5:
Figs. 5, 6 and 7 are cross sections of various forms of composite tape according to this invention.

Fig. 5 shows one form of composite tape which consists of a series of paper strips (4) laid together longitudinally and surrounded by a covering (6) provided with a conductive surface.

Figure 6:
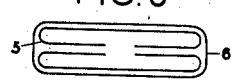
Figure 7:

In Figs. 6 and 7 other forms of composite tape are shown which consists of one or more strips (5) of folded paper enclosed in the covering (6) provided with a conductive surface.

Figure 8:
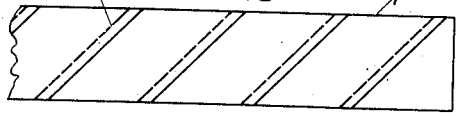
Figs. 8, 9, 10 and 11 illustrate methods of application of the conductive covering to the composite tape.
Figure 9:
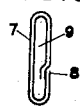

Figs. 8 and 9 illustrate one method of applying the conductive covering to porous tapes such as shown in Figs. 5, 6 and 7. Metallized paper 7 with a metallized surface placed outwards is wound helically over the porous tape core (9). Instead of metallized paper metallic tape can be used. The metallized paper is wound over the porous core either with or without overlap 8.

Figure 10:
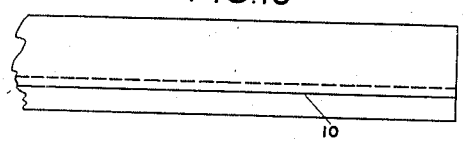
Figure 11:

Figs. 10 and 11 show an alternative arrangement of covering the porous tape core with a conductive layer. In this case, the metallized paper 7 or alternatively metal tape is placed over the porous core 9, longitudinally with or without an overlap 10.

Figure 12:
Figs. 12 and 13 are cross sections of covered composite tape according to this invention.
Figure 13:

In Fig. 12 is shown an enlarged view of the construction of the composite tapes shown in Figs. 8, 9, 10 and 11, when metallized paper is used. The metal surface 11 of the metallized paper is on the outside and the paper side 12 of the metallized paper on the inside of the composite tape facing the porous paper strips (4) forming a core. When metal tape is used the arrangement is as shown in Fig. 13. Porous paper strips are bound or covered with a paper tape 14 and over this, forming the outer surface of the composite tape, is placed a metal tape 13.

In order to facilitate the flow of compound to and from the porous core of the composite tape, a wick of paper or other porous material, preferably in form of tape can be inserted in between the turns or layers of the conductive covering (6), in such a manner that a portion of this wick or tape is in contact with a porous core and the portion projects beyond and outside the metallic surface.

Similarly, in order to improve the flow of compound to and from the main insulation B and the porous layer D, the porous paper or like material, preferably in form of tape, can be made to project from between the successive convolutions of the tape forming the intersheath C. It is preferable when using this porous wick arrangement for the intersheath C in conjunction with the porous layer consisting of alternately plain and composite tapes that the composite tape coincides with the exposed metallized surface of the intersheath so that the maximum electric contact is obtained between the intersheath (C) and the outer sheath.

What is claimed is:

1. A single core electric cable comprising a conductive core, an impregnated fibrous dielectric surrounding the core, a permeable conductive intersheath surrounding the dielectric, an outer cover and a porous layer interposed between the intersheath and the outer cover, the said layer consisting of a porous material applied in an open helix over the said intersheath and a composite tape consisting of porous material and conducting material placed in the space between the adjacent turns of the helix.

2. A single core electric cable comprising a conductive core, an impregnated fibrous dielectric surrounding the core, a permeable conductive intersheath surrounding the dielectric, an outer cover and a composite tape consisting of metallized paper interposed between the intersheath and the outer cover.

3. A single core electric cable comprising a conductive core, an impregnated fibrous dielectric surrounding the core, a permeable conductive intersheath surrounding the dielectric, an outer cover and a composite tape interposed between the intersheath and the outer cover the said tape comprising a series of paper strips surrounded by a covering provided with a conductive surface.

4. A single core electric cable comprising a conductive core, an impregnated fibrous dielectric surrounding the core, a permeable conductive intersheath surrounding the dielectric, an outer cover and a composite tape interposed between the intersheath and the outer cover, the said tape comprising at least one strip of folded paper enclosed in a conductive covering.

5. A single core electric cable comprising a conductive core, an impregnated fibrous dielectric surrounding the core, a permeable conductive intersheath surrounding the dielectric, an outer cover and a composite tape interposed between the intersheath and the outer cover, said composite tape comprising at least one strip of porous material surrounded by metallized paper.

6. An electric cable comprising a conductive core, inner and outer layers of porous dielectric material surrounding the core, a permeable metallized intersheath between the two layers, the outer layer comprising a composite tape composed of strips of porous material and surrounded by a conducting layer consisting of metallized paper, said outer layer being considerably less absorbent for an impregnating fluid than said inside layer.

7. An electric cable as claimed in claim 6, in which metallized paper is applied spirally over said porous material.

8. An electric cable comprising a conductive core, inner and outer layers of porous dielectric material surrounding the core, a permeable metallized intersheath between the two layers, said outer layer comprising strips of porous material and surrounded by a layer of metallized tape, the strips of porous material projecting between the folds of the metallized tape.

THOMAS ROBERTSON SCOTT.
NORMAN ARTHUR ALLEN.